March 15, 1949.  C. PITON  2,464,716
METHOD OF ASSEMBLING VARIABLE CONDENSERS
Filed April 18, 1945
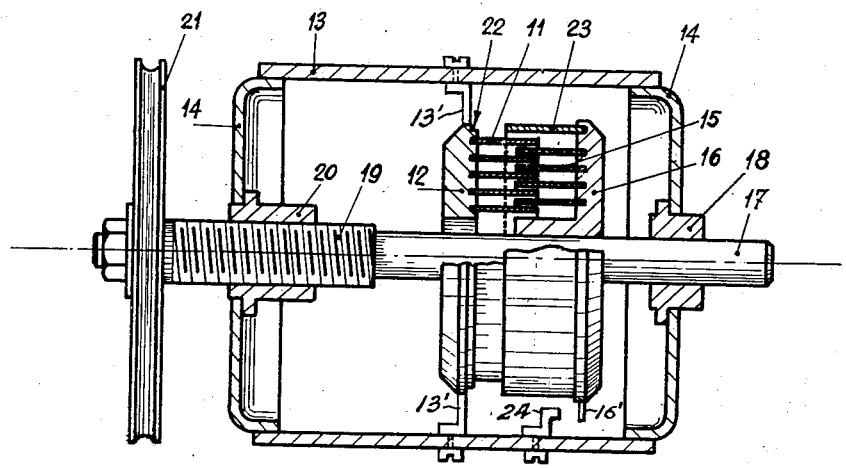
Inventor,
Charles Piton
By
Young, Emery & Thompson
Attys.

Patented Mar. 15, 1949

2,464,716

UNITED STATES PATENT OFFICE 2,464,716

METHOD OF ASSEMBLING VARIABLE CONDENSERS

Charles Piton, Geneva, Switzerland, assignor, by mesne assignments, to Hermann Thorens S. A., a corporation of Switzerland Application April 18, 1945, Serial No. 588,972
In Switzerland August 19, 1944

1 Claim. (Cl. 29—25.41)

The present invention refers to a variable condenser composed of a stationary armature and a mobile armature, these armatures being equipped with concentric electrodes of rotation-cylinders or parts of rotation-cylinders, the electrodes of the mobile armature penetrating between the electrodes of the stationary armature.

In this type of condenser, the stationary armature is generally fixed to a housing by means of insulating members, whereas the moble armature is fastened to a shaft located in the housing, which shaft may be moved with respect to the housing in a rotational or translatory manner between two limits corresponding respectively to the maximum and minimum capacity of the condenser. For the condensers of this type utilized for the construction of radio-electric apparatus, the dielectric distance separating the electrodes of the stationary and moble armatures is often reduced to a fraction of a millimeter. As a consequence thereof the manufacture and the assembly of these condensers require a very great precision. For practical purposes it is even impossible to machine the various parts of the condenser with a precision sufficiently great, that when assembling the two armatures independently from each other with the housing, an even and constant dielectric distance be obtained between the electrodes for each position of the mobile armature. It is therefore first necessary to assemble one of the armatures with the housing and then to center the second armature with respect to the first by the provisional introduction between the two armatures of a series of wedges suitable for regulating of the dielectric distance. After this operation the second armature is then fixed to its support and the provisional wedges are retired again. This method of assembly does not always give satisfaction, since the wedges used may either damage the generally fragile electrodes or provoke temporary deformations, which, after taking off of the wedges, may again modify the relative positions of the stationary and of the mobile armatures.

The object of the present invention is to eliminate the inconveniences mentioned above. Its object is a method of assembling a variable condenser comprising a stationary armature fixed to a housing and a mobile armature guided by this housing, these armatures being provided with concentric electrodes of rotation-cylindrical shape or part of rotation-cylindrical shape, the electrodes of the mobile armature penetrating between those of the stationary armature. This method differs from the known methods in that, for assembling the stationary and mobile armatures with the housing, the two armatures are aligned in co-axial position by bringing into contact centering surfaces provided for this purpose on each of the said armatures, and, after assembly being terminated, by disengaging these centering surfaces from each other and by providing the housing with at least one stop preventing the two armatures from coming into contact with each other.

Another object of the present invention is a variable condenser comprising a stationary armature fixed to a housing and a mobile armature guided by this housing, these armatures carrying concentric electrodes of the shape of rotation-cylinders of part of rotation-cylinders, the electrodes of the mobile armature penetrating between those of the stationary armature, each of the said armatures being provided with at least one centering-surface destined for entering into contact with a corresponding centering-surface of the other armature in order to align in a co-axial manner one armature with respect to the other. This condenser differs from the known condensers in that each of its armatures comprises at least one centering-surface provided for entering into contact with one of the corresponding centering-surfaces of the other armature in order, that for assembling of the condenser, the armatures be brought in co-axial relation automatically.

The annexed drawing shows, schematically and as a matter of example, a longitudinal cross-section of a condenser assembled according to this invention.

The stationary armature of the condenser shown on this drawing is constituted by a series of plates 11 having the shape of concentric rotation-cylinders, these plates being fixed on a circular plate 12 which in turn is fastened to a housing 13 by the intermediary of insulating means 13'. The housing comprises two frontal walls 14. The mobile armature is constituted of a series of plates 15 having the shape of concentric rotation-cylinders, penetrating between the plates 11 and being fixed on a circular plate 16 which in turn is itself fastened to a shaft 17. This shaft is guided at one of its ends by a smooth bearing 18 and is provided at its other end with a micrometric threading 19 and a nut 20. Bearing 18 and nut 20 are fixed to the frontal walls 14 of the housing. The shaft 17 carries a pulley 21 provided with a groove and utilized for controlling the displacements of the mobile armature of the condenser by means of a cable not shown in the drawing. Lastly, the circular plate 12 is provided with a shoulder 22 formed of a plane, circular-shaped surface and of a cylindrical surface having a diameter which corresponds to the interior diameter of the cylindrical metallic protecting-cover 23 fastened to the plate 16 and enclosing the plates 15 of the mobile armature. The whole, constituted of the shoulder 22 and the protecting-cover 23 constitutes the device utilized for centering, at the instant of assembly, the stationary armature with respect to the mobile armature. The shoulder 22 as well as the protecting-cover 23 are very accurately centered during manufacture, the first mentioned with respect to the plates of the stationary armature and the second with respect to the plates of the mobile armature.

The assembly of the condenser is carried out as follows:

Once the mobile armature, comprising the plate 16 equipped with the plates 15 and the protective cover 23, is fixed to the shaft 17, the stationary armature is placed in such a manner, that the protecting-cover 23 engages with the cylindrical surface of the shoulder 22 and that the edge of the protecting-cover bears the plane circular surface of the shoulder. The shaft 17 is then asembled with the bearing 18 and the nut 20, whereby these two parts having each previously been fastened to one of the two frontal walls 14. Over the whole is then slid the housing 13 which in turn is fastened to the two frontal walls 14 by soldering. After this, the stationary armature is then fastened to the housing by means of insulators 13'. The housing being assembled and the stationary armature being fastened to this said housing whilst the protecting-cover 23 is engaged with the shoulder 22, it is evident that the stationary and mobile armatures are rigorously centered with respect to each other. By turning the shaft 17, the mobile armature is then disengaged from its provisional coupling with the stationary armature. The definite adjusting range of the mobile armature is limited by means of stops 24, stops which are fastened in the housing and against which come to bear pins 16' fixed to the periphery of the plate 16.

In the example described above, the stationary armature is fixed to the housing after the assembly of the bearings and of the frontal plates with the housing. It is evident, that the design of the condenser may be such, that the bearings and the frontal plates are assembled with the housing after the stationary armature having been fixed to the housing. This method may be utilized in all cases in which the mobile armature describes a rotational or translatory motion with respect to the stationary armature. It is also evident, that instead of being provided on the periphery of the armatures, the bearing surfaces for centering mutually the two armatures may be disposed near the axis of rotation or in an intermediate position. It is also possible to provide a double-centering in as much as one of the centering devices is equipped with a male part and the other with a female part for one and the same armature. This solution may be used particularly in those cases in which the armatures have the shape of half-cylinders limited by a plane passing through their axis.

I claim:

A method of assembling a variable condenser having a stationary armature fixed to a housing and a mobile armature guided by the housing, said armatures carrying concentric electrodes of rotation-cylinder shape or part of rotation-cylinder shape, the electrodes of the mobile armature penetrating between those of the stationary armature, comprising bringing the two armatures into co-axial relation with respect to each other by bringing into contact centering-surfaces provided for this purpose on each of the said armatures, and by disengaging these centering surfaces, after assembly, from each other and then fixing a stop to the housing for preventing a further coming into contact of the said armatures.

CHARLES PITON.

REFERENCES CITED

The following references are of record in the file of this patent:

UNITED STATES PATENTS

| Number | Name | Date |
| --- | --- | --- |
| 1,150,895 | Sloan | Aug. 24, 1915 |
| 1,625,330 | Pinkus | Apr. 19, 1927 |